(12) United States Patent
Koh et al.

(10) Patent No.: US 6,628,854 B1
(45) Date of Patent: Sep. 30, 2003

(54) CONNECTOR-TYPE OPTICAL TRANSCEIVER USING SOI OPTICAL WAVEGUIDE

(75) Inventors: Han-Jun Koh, Seoul (KR); Min-Ho Choi, Seoul (KR); Do-Youl Kim, Seoul (KR)

(73) Assignee: Aligned Technologies Incorporated, Kyonggi-do (KR)

(*) Notice: Subject to any disclaimer, the term of this patent is extended or adjusted under 35 U.S.C. 154(b) by 0 days.

(21) Appl. No.: 10/031,710

(22) PCT Filed: Aug. 25, 1999

(86) PCT No.: PCT/KR99/00481

§ 371 (c)(1), (2), (4) Date: Jan. 23, 2002

(87) PCT Pub. No.: WO01/11405

PCT Pub. Date: Feb. 15, 2001

(30) Foreign Application Priority Data

Aug. 5, 1999 (KR) .......................................... 1999-32164

(51) Int. Cl.[7] .............................................. G02B 6/30
(52) U.S. Cl. ............................. 385/14; 385/49; 385/50; 385/88; 385/129
(58) Field of Search .............................. 385/14, 49, 50, 385/51, 88–94, 129, 131, 130, 132; 257/84, 88, 622

(56) References Cited

U.S. PATENT DOCUMENTS

| 5,629,534 A | 5/1997 | Inuzuka et al. ................ 257/84 |
| 2002/0037137 A1 * | 3/2002 | Wu et al. ...................... 385/49 |
| 2003/0007754 A1 * | 1/2003 | Terashima .................... 385/92 |

FOREIGN PATENT DOCUMENTS

| EP | 0723171 A2 | 7/1996 |
| GB | 2213957 | 8/1989 |
| GB | 2307786 | 6/1997 |

* cited by examiner

Primary Examiner—Hemang Sanghavi

(57) ABSTRACT

A connector-type optical transceiver includes optical devices, a silicon-on-insulator (SOI) optical waveguide and a silicon bench whose upper surface is provided with a U-shaped recesses for receiving the optical devices and the SOI optical waveguide, while being aligned to form optical paths. The SOI optical waveguide includes a silicon substrate, a single crystalline silicon layer whose upper surface is provided with waveguide portions, and a silica thin layer interposed between the silicon substrate and the single crystalline silicon layer to prevent light passing through the waveguide portions from being diffused. The silicon bench has v-shaped grooves extending longitudinally along the silicon bench and receives guide pins adapted to guide an external connecting terminal to be connected to the silicon bench.

8 Claims, 5 Drawing Sheets

CONNECTOR-TYPE OPTICAL TRANSCEIVER USING SOI OPTICAL WAVEGUIDE

BACKGROUND OF THE INVENTION

1. Technical Field

The present invention relates to a connector-type optical transceiver using a silicon-on-insulator (SOI) optical waveguide, and more particularly to an optical transceiver provided with a detachable connector and adapted to transmit and receive optical signals using an SOI optical waveguide.

2. Description of the Prior Art

The widespread exchange of information (e.g., image, text and audio data) and Internet communication, which is expected to continue to expand to great proportions, has greatly increased the demand for high-rate data transmission and reception. To this end, the incorporation of ultra-high-rate data communication networks using fiber optic transmission lines (hereinafter referred to as "optical fibers") has been actively pursued.

Such optical communication networks are basically made up of optical fibers, which are media for transmitting optical signals, an optical transceiver module for converting an optical signal into an electrical signal and vice versa, and components for distributing, amplifying and modulating transmission signals. The optical transceiver module is the most important component in constructing an optical communication system. The cost of these modules, however, hinders the widespread usage and incorporation of optical communication networks. There two primary factors interfering with cost reduction: technical difficulty in aligning the optical fiber with a laser diode, which requires 1 μm tolerances, and the enormity of the investment costs needed for the necessary mass-production equipment. In particular, the costs required to implement a packaging process adapted for the alignment between the optical fiber and laser diode forms 70~80% or more of the total manufacturing costs of the optical transceiver module.

Alignment between the laser diode and optical fiber is achieved using one of two basic methods. These are active alignment and passive alignment.

In the active alignment method, the coupling position is determined by peaking the amount of laser-diode light incident to a juxtaposed optical fiber. The laser diode and optical fiber are then fused at the determined coupling position using a laser welder or bonded using an epoxy adhesive.

In the passive alignment method, the coupling position between the laser diode and optical fiber is determined without activating the laser diode. The passive alignment method may be achieved by identifying the respective positions of the laser diode and optical fiber using an image processing apparatus, or by a flip-chip bonding method which makes use of a phenomenon whereby molten metal exhibits an advantageous surface tension. Another method has also been proposed in which a silicon bench is micro-machined to have a specified three-dimensional structure using photolithography, to allow optical devices having different functions to be integrated on the same bench. Recently, the use of such passive alignment methods has increased due to their shorter processing times and lower costs than those of the active alignment method.

FIG. 1 shows a conventional connector-type optical transceiver module using optical fibers. As shown in FIG. 1, the optical transceiver module uses a connector 1 which is known as a mechanically transferable reinforced jacket (MT-RJ). An external connecting terminal (not shown) is connected to the connector 1 while being guided by a pair of guide pins 15 provided at the connector. Accordingly, an optical path established by optical fibers 2, which extend through the connector 1, is brought into precise alignment with the external connecting terminal.

The conventional transceiver module is fabricated by arranging optical fibers 2 and optical devices (e.g., a laser diode, a photo diode, a monitor photo diode and/or an SOI waveguide) on a silicon bench 3 in respective V-shaped micro-grooves of the silicon bench, such that the optical devices and optical fibers are aligned and bonded on the silicon bench. To avoid an optical coupling loss, the optical fibers 2 should be polished at their ends, to have mirror-like surfaces.

However, the optical fibers 2 used in the conventional optical transceiver module have an outer diameter of 125 μm and therefore experience difficulty in manipulation and handling. Furthermore, polishing the cut ends of the optical fibers 2 is an expensive operation, and the optical fibers are separately bonded to the silicon bench 3. Such exacting requirements, together with the high costs, have impeded efforts to mass-produce the transceiver modules.

In order to solve the difficulty in processing the optical fibers 2, a planar light-wave circuit (PLC) method has been proposed, in which a silica waveguide is used in place of the optical fibers. The PLC method uses frame hydrolysis deposition method to micro-machine a silica PLC board to have an alignment structure for arranging and aligning optical devices on the PLC board. However, the frame hydrolysis deposition process is expensive and therefore hinders cost reduction efforts.

Meanwhile, the passive alignment method using the conventional flip-chip bonding technique makes it difficult to simultaneously bond a variety of optical devices on the same silicon bench. However, flip-chip bonding, which achieves the alignment of optical devices using the surface tension of molten solder, requires special equipment to implement an anti-oxidation effect upon melting the solder, which is expensive but necessary to avoid a reduction in surface tension due to oxidation. Without the anti-oxidation effect, adequate surface tension is lost which results in the loss of a desired position control.

In order to solve these problems, a new method has been proposed in which optical devices are temporarily bonded onto desired positions using ultrasonic waves, while maintaining a positional accuracy of several tens of micrometers, and are then metal-bonded in a batch fashion.. Ultrasonic bonding, however, is a time-consuming operation, and damage to the optical devices is likely, due to the vibratory impact applied thereto during the bonding process.

SUMMARY OF THE INVENTION

Therefore, an object of the invention is to solve the above-described problems involved in the conventional methods, and to provide a connector-type optical transceiver which can be fabricated at low cost.

Another object of the invention is to provide a connector-type optical transceiver which can be easily fabricated using an automated process.

Yet another object of the invention is to provide an optical transceiver fabricated using a planar SOI optical waveguide instead of optical fibers.

Still another object of the invention is to provide an optical transceiver which achieves a reduction in the number of, components used to constitute an optical transceiver module and a simplified manufacturing process.

Still yet another object of the invention is to provide an optical transceiver which realizes each of the above objects without using an MT-RJ connector fixedly mounted to the silicon bench.

In accordance with the present invention, these objects are accomplished by providing a connector-type optical transceiver comprising: a plurality of optical devices; a silicon-on-insulator (SOI) optical waveguide including a silicon substrate, a single crystalline silicon layer whose upper surface is provided with waveguide portions, and a silica thin layer interposed between the silicon substrate and the single crystalline silicon layer, to prevent light passing through the waveguide portions from being diffused; and a silicon bench whose upper surface is provided with U-shaped recesses receiving the optical devices and the SOI optical waveguide, while being aligned to form optical paths.

In accordance with an embodiment of the present invention, the silicon bench has V-shaped grooves extending longitudinally along the silicon bench, receiving guide pins adapted to guide an external connecting terminal to be connected to the silicon bench.

In accordance with an embodiment of the present invention, each of the waveguide portions comprises a longitudinal protrusion, integrally formed with and protruding from the upper surface of the single crystalline silicon layer, to allow an optical signal to pass.

The optical transceiver of the present invention is configured such that a silicon bench is formed with V-shaped grooves, to receive guide pins for connection to an external connecting terminal.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
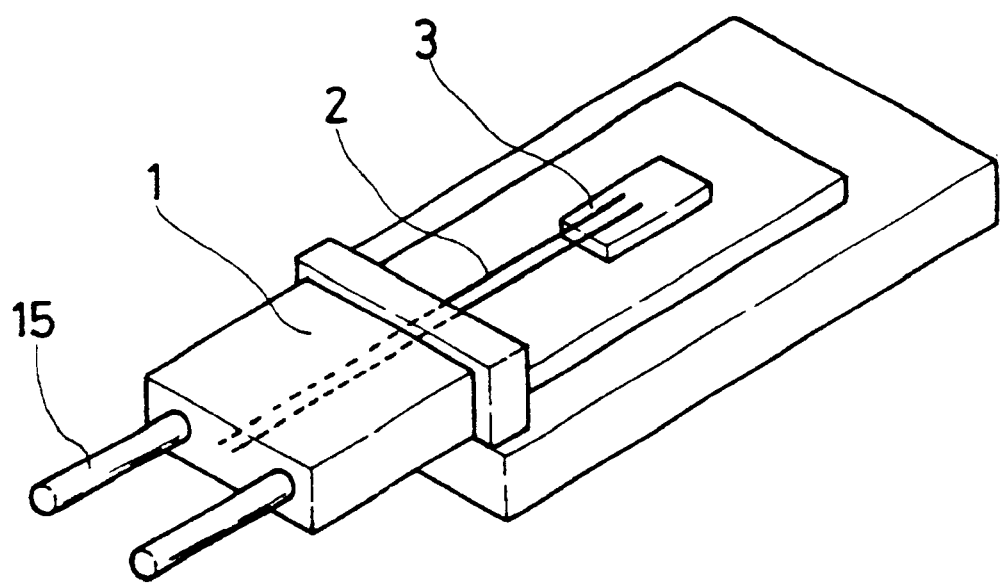
FIG. 1 is a perspective view of a conventional connector-type optical transceiver module using optical fibers.
Figure 2:
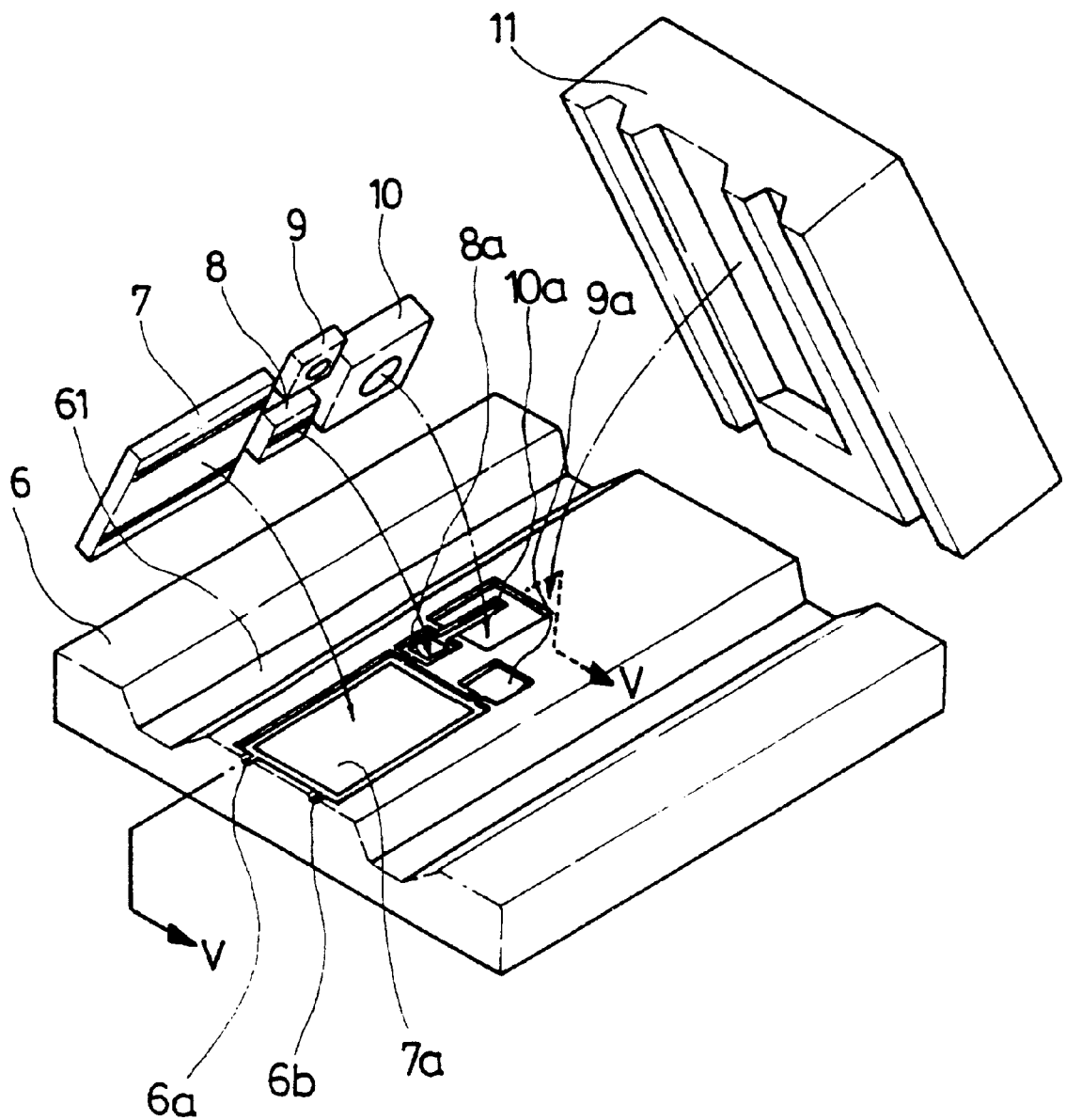
FIG. 2 is an exploded perspective view of a connector-type optical transceiver using an SOI optical waveguide, according to an embodiment of the present invention.

FIG. 2 illustrates an embodiment of an connector-type optical transceiver according to the present invention. The optical transceiver module uses an SOI optical waveguide to constitute an optical path, instead of the optical fibers or silica waveguides used in conventional transceiver modules.

As shown in FIG. 2, the optical transceiver module includes a silicon bench 6 which is fabricated by micro-machining a silicon wafer using an etching solution of potassium hydroxide (KOH). The upper surface of the silicon bench 6 is centrally provided with U-shaped recesses to respectively receive a variety of optical devices, for example, an SOI optical waveguide 7, a laser diode 8, and photo diodes 9 and 10. The U-shaped recesses 7a, 8a, 9a and 10a are formed at positions where the optical devices are to be aligned on the silicon bench 6. Micro-passages 6a and 6b are formed adjacent the U-shaped recesses so that the optical path of the transceiver module extends along its length in an uninterrupted path. A pair of guide grooves 61 are respectively formed on the upper surface of the silicon bench 6 at opposite sides of the silicon bench 6. A pair of guide pins 17 (shown in FIGS. 6 and 7) are respectively received in the guide grooves 61. By virtue of the guide pins 17, the optical transceiver module can be easily connected to and disconnected from an external connecting terminal.

Figure 4:
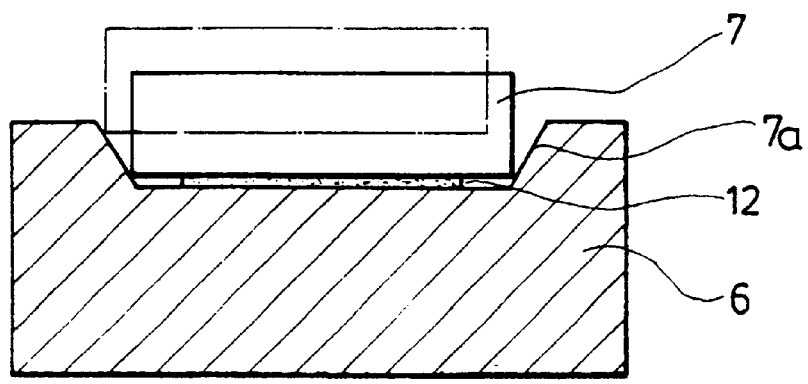
FIG. 4 is a cross-sectional view illustrating the principle of self-alignment of the SOI optical waveguide on a silicon bench, in accordance with the embodiment of the present invention.

Referring to FIG. 4, which schematically illustrates the principle of a self-alignment of an optical device (in this case, the SOI optical waveguide 7) on the silicon bench 6, a micro-machined U-shaped recess 7a is adapted to receive the optical waveguide 7. The U-shaped recess 7a has a bottom and inclined side walls surrounding the bottom, so as to form a trapezoidal cross section whose sloped sides form an angle of, preferably, 54.7°. Typically, the U-shaped recess 7a is micro-machined to have a depth of 30 $\mu$m, a bottom width of 950 $\mu$m, and a bottom length of 1,500 $\mu$m. The SOI optical waveguide 7 can be easily and accurately seated in the U-shaped recess 7a using a pick-and-place machine with an accuracy of several tens of micrometers. By this operation and in accordance with the trapezoidal cross section, the SOI optical waveguide 7 can be self-aligned on the silicon bench 6. That is, even though the SOI optical waveguide 7 may be inaccurately received in the U-shaped recess 7a, as indicated by a dotted line in FIG. 4, the waveguide slides along the inclined side walls of the U-shaped recess to its accurate seating position, as indicated by the solid line. Similarly, the laser diode 8 serving as a light emitting source, the monitor photo diode 10 for controlling the intensity of light emitted from the laser diode 8, and the photo diode 9 for receiving the emitted light can also be easily aligned on the silicon bench 6 in recesses having the same general structure as the U-shaped recess 7a.

All these optical devices to be aligned are fabricated by forming a pattern on a wafer using a photolithography process maintaining an accuracy of 1 $\mu$m or less, processing the wafer using the pattern and a KOH etching solution while controlling the processing temperature and time, and adjusting the size of the resultant structure using non-contact, three-dimensional measuring equipment.

An example of an optical device is a laser diode having a 1,300 nm-wavelength InP-strained multi-quantum well structure which is grown using a metal organic chemical vapor deposition (MOCVD) apparatus. The diode is formed by etching using a solution prepared by mixing an $H_2SO_4$ solution and an HCl solution and is then cut into pieces, each corresponding to one laser diode 8, while maintaining an outer-dimension accuracy of 0.5 $\mu$m. The photo diode 9 and monitor photo diode 10 are machined with an accuracy of 5 $\mu$m, using a scoring-and-breaking method.

Figure 3:
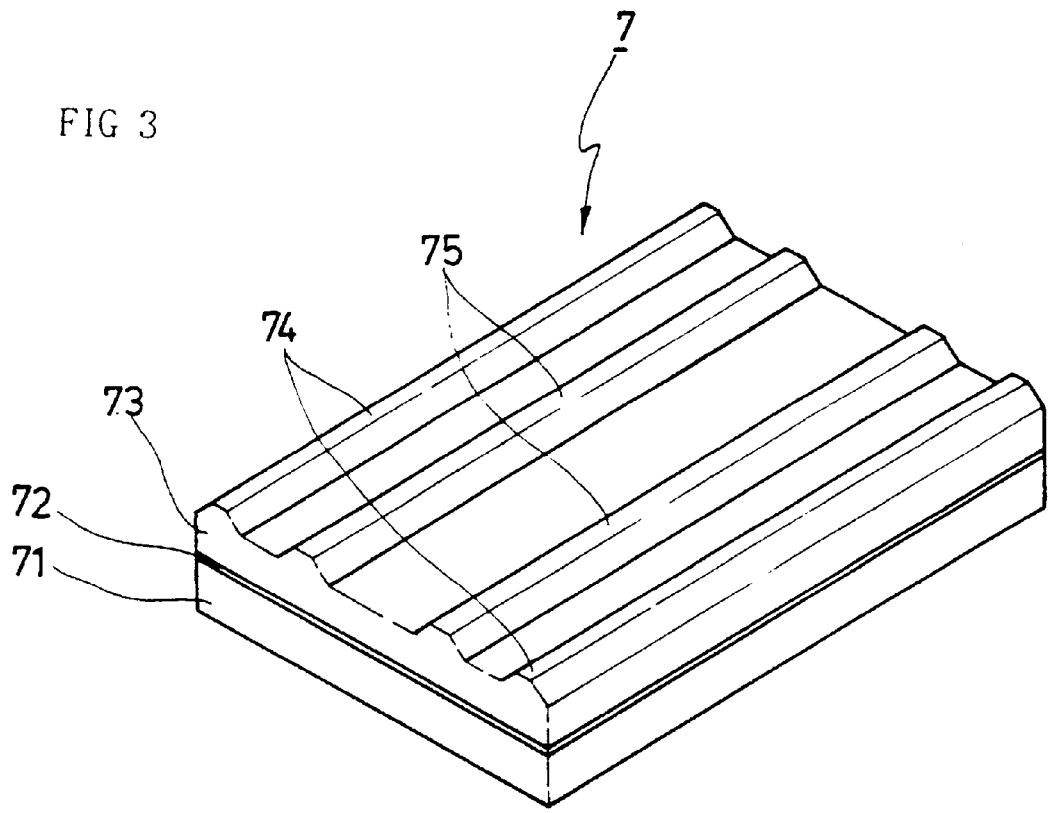
FIG. 3 is a perspective view of the SOI optical waveguide of the present invention.

FIG. 3 is a detailed perspective view of the structure of the optical waveguide 7 which, in accordance with the preferred embodiment of the present invention, is made using an SOI wafer commonly used as the substrate for Si—Ge devices. As shown in FIG. 3, the optical waveguide 7 includes a silicon substrate 71, a silica thin layer 72 formed over the silicon substrate, and a single crystalline silicon layer 73 formed over the silica thin layer. A pair of bonding portions 74 and a pair of waveguide portions 75 are formed at the upper surface of the single crystalline silicon layer 73. The silica thin layer 72, which is interposed between the silicon substrate 71 and the single crystalline silicon layer 73, is preferably formed to have a thickness of about 0.2 $\mu$m and prevents light traveling along the waveguide portion 75 from being guided into the silicon substrate 71. The formation of the bonding portions 74 and waveguide portions 75 is achieved by forming a pattern on the single crystalline silicon layer 73, using a photolithography process, and then etching the single crystalline silicon layer using a KOH etching solution. The waveguide portions 75 optically couple the laser diode 8 and photo diode 9 to an external connecting terminal 13 (shown in FIG. 7). That is, the waveguide portions 75 provide the main optical path for transmitting light.

The bonding portions 74, where the SOI optical waveguide 7 is metal-bonded to the silicon bench 6, is machined in the same manner as the waveguide portions 75. However, chromium and gold are deposited to a thickness of about 0.6 $\mu$m on the upper surface of each bonding portion 74. A cladding layer need not be coated over the waveguide portions 75 because the waveguide portions exhibit an index of refraction considerably different from that of air. The finally machined SOI optical waveguide 7 has a width of 950 $\mu$m and a length of 1,500 $\mu$m. The waveguide portions 75 define a space of, preferably, 750 $\mu$m, which corresponds to the spacing between the optical fibers of the external connecting terminal 13.

The optical waveguide 7 having the above-described structure is fixed to the silicon bench 6 using a planar metal bonding process. The metal bonding of the optical waveguide 7 to the silicon bench 6 is achieved by heating a solder, layer 12 (shown in FIG. 4), which is comprised of an Au—Sn alloy layer deposited over the silicon bench 6, to a temperature of 280° C. or more, thereby melting the solder layer 12, and the melted layer is allowed to cool. Alignment of other optical devices, including the laser diode 8, is carried out in the same manner as that of the SOI optical waveguide 7. After the alignment, these optical devices are simultaneously subjected to a metal bonding process. The metal bonding for the optical devices can be achieved without the need for a separate anti-oxidation function. That is, the optical devices can be simultaneously metal-bonded by merely heating the solder layer 12 to its melting point (or higher) and then cooling. Accordingly, a low-cost optical communication module having an integrated structure can be manufactured.

According to the present invention, optical devices such as the SOI optical waveguide 7 and laser diode 8, which are bonded to the silicon bench 6 after being self-aligned on the silicon bench 6, are protected from thermal impacts caused by variations in temperature. Furthermore, since the handling of the SOI optical waveguide 7 is simpler than handling optical fiber, the mass production of optical transceiver modules is enabled.

While it is difficult to achieve a hermetic seal when using optical fibers, the SOI optical waveguide 7 can be easily hermetically sealed due to its planar structure. SOI optical waveguides can also be applied to the manufacture of integrated modules such as photo switches, multi-wavelength modules, or multi-chip modules.

In accordance with the present invention, V-shaped grooves are formed at the silicon bench 6 in order to receive guide pins to be connected to an external connecting terminal, in contrast to the conventional method in which a connector having guide pins is fixedly mounted to an optical transceiver module. Accordingly, the present invention achieves a reduction in the number of components used to constitute an optical transceiver module, a simplified manufacturing process, and a minimized optical coupling loss.

Figure 5:
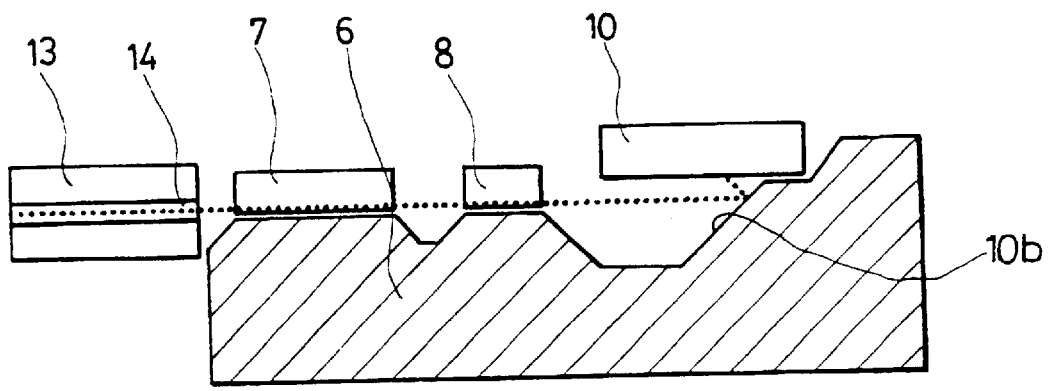
FIG. 5 is a cross-sectional view taken along line V—V of FIG. 2, showing the optical path of optical devices aligned using the principles of the present invention.

FIG. 5 schematically illustrates an optically coupled state of the optical devices bonded to the silicon bench. The laser diode 8 converts an electrical signal into an optical signal, thereby emitting light. Light forwardly emitted from the laser diode 8 enters the SOI optical waveguide 7. The light emerging from the SOI optical waveguide 7 travels into an optical fiber 14 of the external connecting terminal 13 in which the optical fiber, having a diameter of 125 $\mu$m, is centrally arranged. Light reversely emitted from the laser diode 8 is reflected by a deposited Au layer 10b on the silicon bench 6 and is then focused into the monitor photo diode which converts the light incident thereto into an electrical signal. Based on the converted electrical signal, the monitor photo diode 10 controls the operation of the laser diode 8 and the intensity of light forwardly emitted therefrom. Each of these optical devices is integrated with the silicon bench 6 to form a compact structure.

Figure 6:
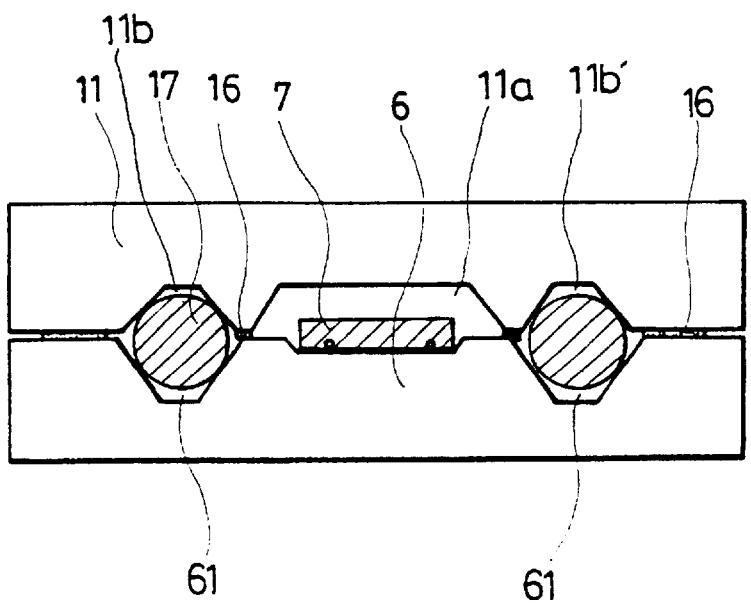
FIG. 6 is a cross-sectional view taken along line VI—VI of FIG. 7.

FIG. 6 illustrates a structure in which the silicon bench 6 is covered with a micro-machined silicon lid 11 in order to protect the optical devices integrated on the silicon bench 6 from external impacts, moisture, and contamination. As shown in FIG. 6, the silicon lid 11 has a U-shaped recess 11a centrally formed at the silicon lid 11 and adapted to receive the SOI optical waveguide 7 seated on the silicon bench 6, and a pair of V-shaped grooves 11b and 11b' formed on the silicon lid 11 at opposite sides of the U-shaped recess and adapted to receive the guide pins 17 seated on the silicon bench 6. The silicon lid 11 is bonded to the silicon bench 6 by means of a thermosetting epoxy resin 16. The guide pins 17, which are respectively arranged in the guide grooves 61 of the silicon bench 6, guide the connection of the optical transceiver module to the external connecting terminal 13. Since the guide pins 17 are fixedly mounted on the silicon bench 6, a tight connection is maintained between the optical transceiver module and external connecting terminal 13. Also, since the external connecting terminal 13 is made of a plastic material, the silicon bench 6 is not damaged by contact or minute collisions therewith.

Figure 7:
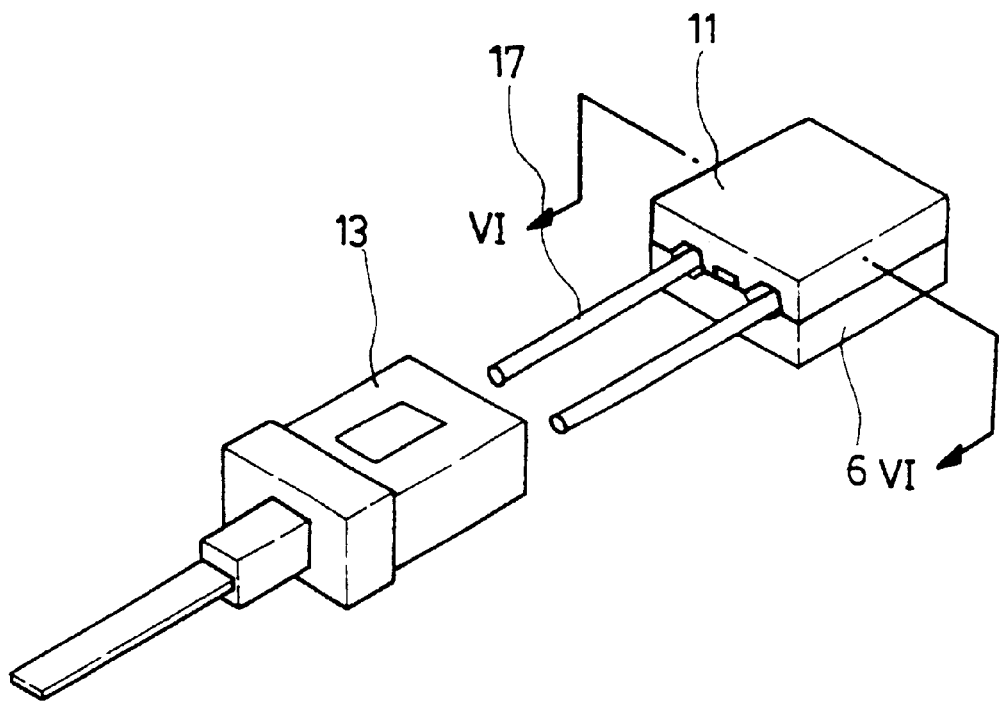
FIG. 7 is an exploded perspective view illustrating a connection of the connector-type optical transceiver to an external connecting terminal, in accordance with the embodiment of the present invention.

FIG. 7 illustrates an optical transceiver module for 155 Mbps-grade optical communications, which has a configuration capable of allowing the external connecting terminal 13 to be separably connected with respect to the optical transceiver module, and shown here in the separated state. A silicon bench 6, in which optical devices are self-aligned together in an optically coupled state, is capped with a silicon lid 11. Guide pins 17 protruding from the silicon bench 6 are connected to the external connecting terminal 13. In this configuration, the external connecting terminal 13 is easily and simply connected to the optical transceiver by means of the guide pins 17 and exhibits a low optical coupling loss of, typically, 2 dB or less. The optical transceiver module of the present invention exhibits an optical coupling loss of about 11 dB when its laser diode is finally connected to external optical fibers.

In accordance with the method of the present invention as described above, it is possible to fabricate an integrated, compact and low-cost optical transceiver module capable of simply achieving the self-alignment of a variety of optical devices.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the foregoing description, the connector-type optical transceiver module according to the present invention uses a planar SOI optical waveguide in place of optical fibers, thereby achieving a reduction in the manufacturing cost while simplifying the manufacturing process to facilitate automation. SOI optical waveguides can also be applied to the manufacture of integrated modules such as photo switches, multi-wavelength modules, or multi-chip modules.

In accordance with the present invention, V-shaped grooves are formed at a silicon bench in order to receive guide pins to be connected to an external connecting terminal, in contrast to a conventional method in which an MT-RJ connector is fixedly mounted to the silicon bench. Accordingly, the present invention achieves a reduction in the number of components used to constitute an optical transceiver module, thereby enabling a simplified and more cost-efficient manufacturing process.

What is claimed is:

1. A connector-type optical transceiver comprising:
   a plurality of optical devices;
   a silicon-on-insulator (SOI) optical waveguide including:
      a silicon substrate,
      a single crystalline silicon layer whose upper surface is provided with waveguide portions, and
      a silica thin layer interposed between the silicon substrate and the single crystalline silicon layer, to prevent light passing through the waveguide portions from being diffused; and
   a silicon bench whose upper surface is provided with a plurality of U-shaped recesses receiving said plurality of optical devices and said SOI optical waveguide, while being aligned to form optical paths.

2. The optical transceiver as claimed in claim 1, wherein said silicon bench has V-shaped grooves extending longitudinally, for receiving guide pins adapted to guide an external connecting terminal to be connected to the optical transceiver.

3. The optical transceiver as claimed in claim 1, wherein each waveguide portion comprises a longitudinal protrusion, integrally formed with and protruding from an upper surface of said single crystalline silicon layer, to allow an optical signal to pass for transformation and reception.

4. The optical transceiver as claimed in claim 3, wherein the SOI optical waveguide has longitudinal bonding portions integrally protruded from the upper surface of said single crystalline silicon layer outside the waveguide portions, the longitudinal bonding portions being adapted to bond the SOI optical waveguide to the silicon bench and coated with metal.

5. The optical transceiver as claimed in claim 4, wherein said plurality of optical devices and said SOI optical waveguide are simultaneously metal-bonded to said silicon bench by heating a solder layer deposited over said silicon bench to a temperature not less than the melting point of the solder layer and allowing the melted solder layer to cool.

6. The optical transceiver as claimed in claim 5, wherein the solder layer is comprised of an Au-Sn alloy layer.

7. The optical transceiver as claimed in claim 1, further comprising a silicon lid to cover said plurality of optical devices and said SOI optical waveguide.

8. The optical transceiver as claimed in claim 7, wherein said silicon lid is bonded to said silicon bench by a thermosetting epoxy resin.

* * * * *